SCR PULSE FORMING AND SHAPING NETWORK

Filed Dec. 9, 1965 Sheet 1 of 2

INVENTORS
RICHARD P. GAGLIARDI
LOUIS C. METZ, JR.
BY
ATTORNEY

INVENTORS
RICHARD P. GAGLIARDI
LOUIS C. METZ, JR.
BY
ATTORNEY

United States Patent Office 3,424,925
Patented Jan. 28, 1969

3,424,925
SCR PULSE FORMING AND SHAPING NETWORK

Richard P. Gagliardi, Philadelphia, and Louis C. Metz, Jr., Abington, Pa., assignors to the United States of America as represented by the Secretary of the Navy Filed Dec. 9, 1965, Ser. No. 513,147
U.S. Cl. 307—268 12 Claims
Int. Cl. H03k *5/01*

ABSTRACT OF THE DISCLOSURE

SCR switching devices are provided in combination with passive storage elements to produce a sharp, high voltage, high current switching pulse of variable pulse width at selected time intervals. Until provided with a control signal, a hold-off circuit inhibits the passage of a D.C. signal which, when passed, is stored by passive elements and thereafter discharged through an SCR, after a preselected time delay. A tail clipper clips the trailing edge of the discharged pulse while a pulse shaping circuit smooths the top thereof.

The invention described herein may be manufactured and used by or for the Government of the United States of America for governmental purposes without the payment of any royalties thereon or therefor.

The present invention relates generally to improvements in pulse modulators and more particularly to new and improved solid state pulse modulators wherein the conduction in traveling wave tubes, for example, is controlled by solid state elements.

Radar transmitters generally employ a pulse generator, a driver circuit, pulse modulator and a traveling wave tube of magnetron. The pulse generator and modulator control the conduction through the traveling wave tube or magnetron, thereby causing radio frequency energy to be produced in short powerful pulses. The pulse modulator performs the function of controlling the shape and duration of the pulses of radio frequency energy by applying these control pulses to the grid-cathode electrodes of the transmitting tube. In general, rectangular modulator pulses are preferred for radar applications so as to provide a sharp leading edge permitting accurate range measurement of echo pulses which is accomplished by comparing the delay time of the echo pulse against the pulses from the transmitter. Since the edge of the echo pulse cannot be steeper than the edge of the transmit pulse, a very sharp rise time of the transmitted pulse is essential to range accuracy. The use of the leading edge in range measurements is preferable over the trailing edge since generally the leading edge of the transmitter pulse can be made much sharper than the trailing edge. To provide more versatility in the use of the radar system, it is desirable to provide means for selectively varying the pulse width of the modulating pulse in accordance with the type of target to be detected, the range of the target and the band-width of the receiver, to mention only a few of the variables.

In the field of pulse modulators and particularly where used in radar transmitters, it has been the general practice to employ gaseous thyratrons to generate the desired control pulses for the traveling wave tubes or magnetrons. Although such devices have served the purpose, they have not proved entirely satisfactory under all conditions of service. In particular, after a short aging period the firing of the thyratrons by the pulse driver may be subject to variation causing a delay error to result. Moreover, slight changes in the firing characteristics due to temperature effects, for example, may cause substantial delay variations in the triggering or firing of the thyratron. These errors which arise are due primarily to the inherent characteristics of the thyratron. Moreover, thyratrons have a short limited life and additionally cause heavy loading on the pulse driver; that is, high power driving signals are required to trigger the thyratrons. As a consequence of the tube delay errors and the heavy loading on the pulse drive, pulse-to-pulse jitter is thereby experienced in the radar operation. These prior art devices were also large and expensive and required considerable maintenance to provide proper radar operation.

The present invention solves the aforementioned problem by employing high speed, high current, solid state switching devices operating in conjunction with passive elements to produce a high voltage, high current switching pulse of variable pulse width at selected intervals. This pulse is then used to control the conduction in a transmitting type traveling wave tube to be used in a radar system, for example.

Accordingly, an object of the present invention is to provide an improved pulse modulator for a radar transmitter or the like which employs only solid state and passive elements to produce a modulating pulse of variable width. The present invention also provides protection means for the solid state devices against reverse voltage and excessive current conditions.

Another object of the present invention is to provide an improved pulse modulator wherein means are provided for producing a modulating pulse with steep rise and fall times and having less pulse-to-pulse jitter. The present invention also provides for a more reliable light weight modulator which is both miniaturized and ruggedized in construction and additionally operates at a reduced ambient temperature.

Various other objects and adavntages will appear from the following description of one embodiment of the invention and the most novel features will be particularly pointed out hereinafter in connection with the appended claims.

Figure 1:
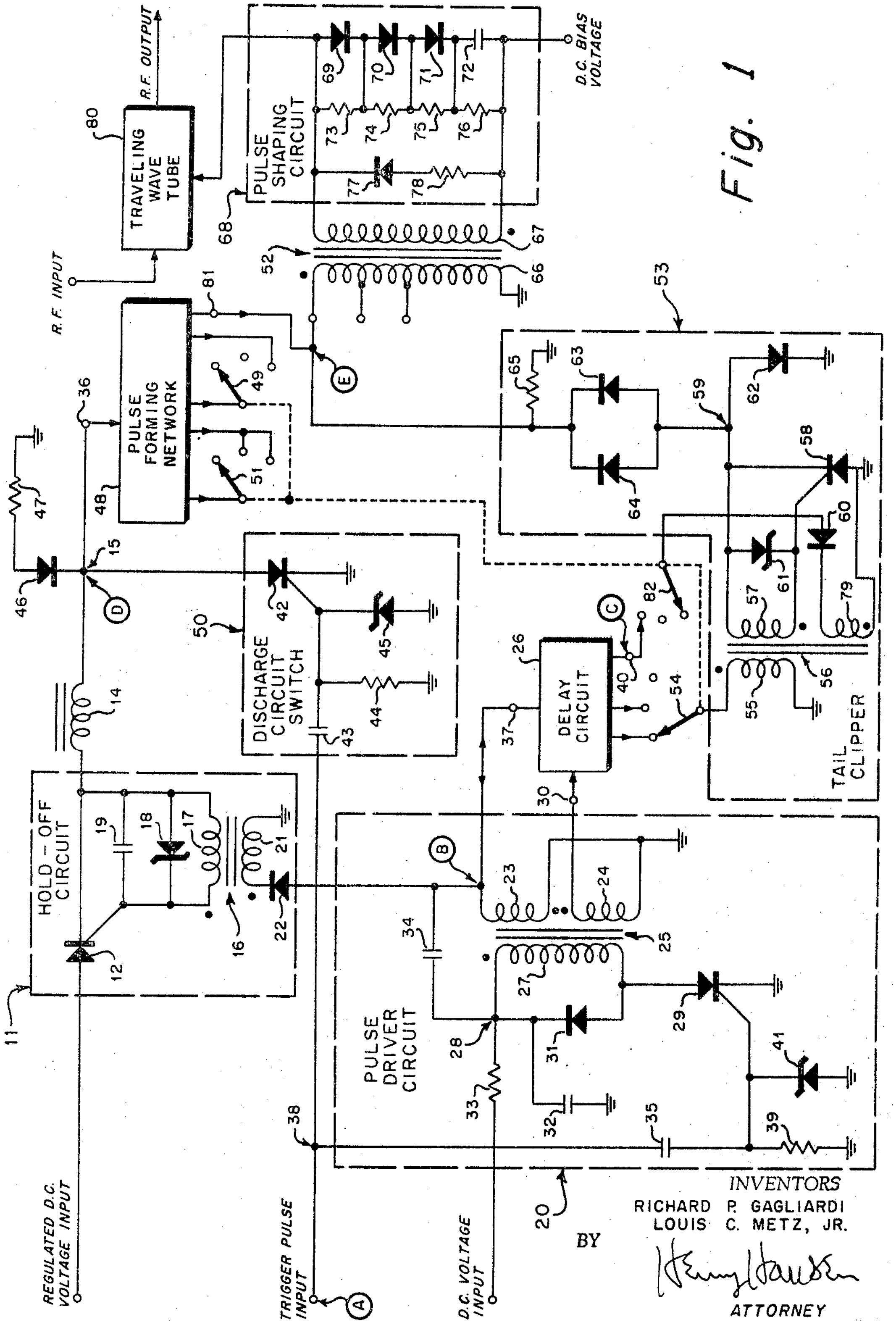
FIG. 1 represents a schematic drawing of one embodiment of a solid state pulse modulator.

Referring more specifically to the drawings, there is shown in FIG. 1 a hold-off circuit 11 which functions to interrupt a regulated D.C. voltage applied to a silicon controlled rectifier 42 and a pulse forming network 48 so as to allow modulator operation at high repetition rates by delaying reapplication of the supply voltage to the silicon controlled rectifier 42 until after it ceases to conduct. The regulated D.C. voltage is connected to the anode of a silicon controlled rectifier SCR 12. The cathode of SCR 12 is connected to the input of a resonant charging reactor. The output of the resonant charging reactor is connected to a junction 15. One end of a secondary winding 17 of a pulse transformer 16 is connected to the gate electrode of SCR 12. The other end of winding 17 is connected to the cathode electrode of SCR 12 and to the input of the resonant charging reactor 14. A Zener diode 18 and a capacitor 19 are connected in parallel with the secondary winding 17. Zener diode 18 is poled with its cathode connected to the gate electrode of SCR 12 and its anode connected to the cathode of SCR 12 and functions to prevent the gating signal applied to the gate-cathode electrodes of SCR 12 from exceeding the Zener diode clipping voltage. Capacitor 19 prevents premature firing of SCR 12 by virtue of the internal junction capacitively coupled currents during charging of pulse forming network 48. A primary winding 21 of pulse transformer 16 is connected by its dotted terminal to the cathode electrode of a diode 22. The undotted terminal of winding 21 is connected to ground.

A pulse driver circuit 20 is connected to a trigger pulse source at a junction 38 and functions in such a way as to produce an amplified pulsed output for each trigger input pulse. A pulse transformer 25 having a primary winding 27 and two secondary windings 23 and 24, respectively, has one end of the secondary winding 23 connected to the anode junction of diode 22. The other end of transformer winding 23 is connected to ground as is one end of the other secondary winding 24. The polarity of the primary and secondary windings of transformer 23 is shown by the conventional dot notation. The other end of winding 24 is connected to an input of a delay circuit 26 through terminal 30. One end of the primary winding 27 of the pulse transformer 25 is connected to a junction 28, and the other end of winding 27 is connected to the anode of an SCR 29. The cathode of SCR 29 is connected to ground. The cathode of a diode 31 is connected to junction 28 and the anode of diode 31 is connected to the anode of SCR 29. A capacitor 32 is connected between junction 28 and ground, and a resistor 33 is connected in series with junction 28 and a source of D.C. voltage. A capacitor 34 is connected between the junction 28 and the anode of diode 22. The anode of diode 22 is also connected to an input-output terminal of the delay circuit 26 through a terminal 37. Junction 38 is coupled to the control electrode of SCR 29 via a capacitor 35. One end of a resistor 39 and the cathode of a Zener diode 41 are connected to the control electrode of SCR 29. The other terminal of resistor 39 and the anode of Zener diode 41 are connected to ground.

Figure 4:
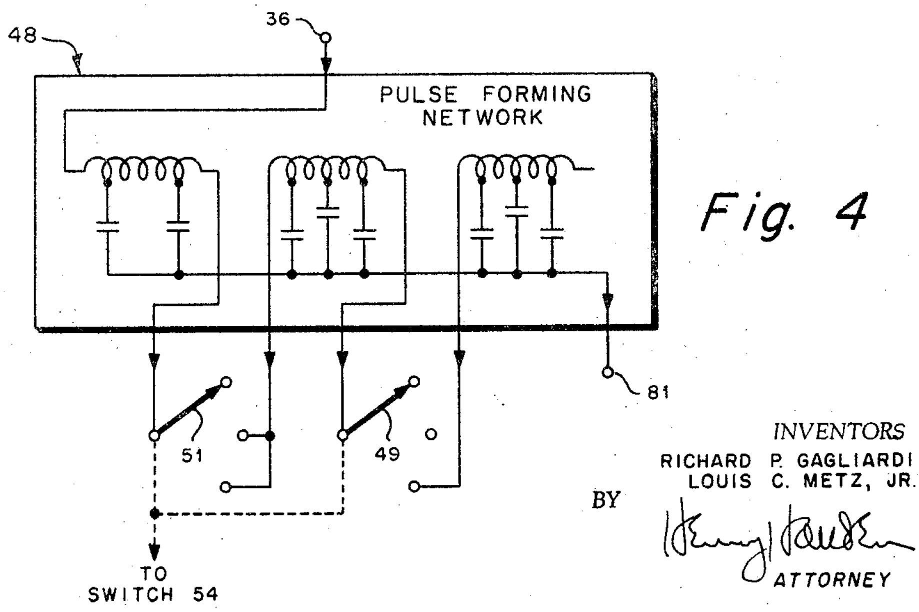
FIG. 4 represents a typical pulse forming network in the specific embodiment described hereinafter.

A discharge circuit switch 50 is connected to the input of pulse forming network 48 at terminal 36 via junction 15 and is used to discharge the pulse forming network in response to the trigger pulses applied to the junction 38. The details of pulse forming network 48 are shown in FIG. 4. Junction 38 is connected to the control electrode of an SCR 42 via capacitor 43. One end of a resistor 44 and the cathode of a Zener diode 45 are connected to the control electrode of SCR 42. The other terminal of resistor 44 and the anode of Zener diode 45 are connected to ground. The anode of SCR 42 is connected to the junction 15 and the cathode is connected to ground.

Although the basic switch component 42 is shown to be a silicon controlled rectifier in this specific embodiment, it is contemplated that a stack of four layered diodes could equally be used, except that the output pulse to a traveling wave tube 80 would be of a fixed amplitude.

A diode 46 and a resistor 47 serially connected between junction 15 and ground are used to protect SCR 42 from inverse voltage transients which may result from the pulse forming network 48 being improperly terminated during the discharge cycle and also to provide a reverse voltage to the anode of SCR 42 to decrease recovery time of the SCR by clearing out the stored charge in the junctions from previous forward current pulses. The cathode of diode 46 is therefore connected to junction 15 and the anode is connected to one end of resistor 47, the other end being connected to ground. Junction 15 is also connected to an input of the pulse forming network 48 at terminal 36 which is typically an inductance-capacitance network wherein a plurality of taps are provided as end points so that various pulse widths may be obtained therefrom. Pulse forming network 48 is of the "open circuited" type; that is, no termination impedance is used at the end of the pulse forming network line. Typical pulse widths that might be obtained from the pulse forming network are 2.0, 6.5 and 24 microseconds in duration depending upon the endpoint selected by switches 49 and 51.

The switches 49 and 51 are connected to the endpoints of the pulse forming network 48, as shown in FIG. 4, so as to provide selectable pulse widths to the input of an isolation transformer 52. The input tap on the isolation transformer is selected so that the best pulse shape at point E is obtained as determined by the best match of the load on the pulse forming network 48.

Switches 49, 51, 54 and 82 are mechanically connected together so that all switches are moved simultaneously through their selectable positions. In this way a tail clipping circuit 53 is energized at the appropriate time-delayed interval from the beginning of output pulse of the pulse forming network 48 so as to produce discrete predetermined pulse widths of 1.5, 6.0 and 22 microseconds. The operator of the radar system is at liberty to select the desired pulse width by simply switching the above-mentioned switches through their selectable positions to obtain the best target resolution on the display indicators.

The tail clipping circuit 53 is connected to the multiple tapped delay line 26 to clip the trailing edge of the pulse appearing at the output of the pulse forming network 48. A typical delay line with a multiple tapped output is shown in greater detail in FIG. 3. The delay line is composed of inductive and capacitive elements with output taps appearing at selected intervals along the inductor so that the tail clipping circuit 53 will be energized at the appropriate time to produce the desired pulse width. The input-output terminal 37 is connected to the undotted end of secondary winding 23. When a negative pulse is applied to terminal 37, it is propagated down the line and as a consequence of the "short circuited" end, the pulse is reflected back time-delayed with respect to the input pulse (waveform B of FIG. 2) to terminal 37 as a positive going pulse and is then used to gate the hold-off circuit 11 as described hereinafter. In addition, another tap 40 is provided in delay circuit 26 at approximately 22 microseconds to provide two-way delay to trigger an SCR 58 through a diode 60, winding 79 of a pulse transformer 56 and by transformer action to secondary winding 57.

A primary winding 55 of a pulse transformer 56 can be considered to be an input of the tail clipping circuit 53; consequently, one end of winding 55 is connected to the wiper arm of a switch 54. The stationary contacts of switch 54 are connected to the multiple outputs of delay circuit 26. The other end of primary winding 55 is connected to ground. One end of a secondary winding 57 is connected to the control electrode of the SCR 58, and the other of secondary winding 57 is connected to a junction 59. The anode of SCR 58 is connected to ground and the cathode is connected to junction 59. The anode of a Zener diode 61 is connected to junction 59 and the cathode is connected to the control electrode of SCR 58. The anode of a clamping diode 62 is connected to junction 59 and the cathode is connected to ground. Junction 59 is connected to an input tap of a transformer winding 66 by a pair of parallel diodes 63 and 64, poled with their anodes to terminal 59. A resistor 65 is connected between the selected tap of primary winding 66 and ground and together with the reflected load from transformer 52 serves as a matched termination for the pulse forming network 48.

The isolation transformer 52 provides D.C. isolation between the pulse forming circuitry and the large negative voltage existing on the input of a traveling wave tube 80. In addition to providing the high voltage isolation, the transformer also exhibits very good low and high frequency response characteristics to pulse signals and thereby couples the input pulse to the grid of the traveling wave tube 80 with high fidelity. The selected tap of primary winding 66 of isolation transformer 52 is connected to terminal 81 and the other end of the primary winding 66 is connected to ground. One end of a secondary winding 67 is connected to a source of negative D.C. voltage to provide bias for the input of the traveling wave tube and the other end is connected to the grid electrode of the traveling wave tube 80.

A pulse shaping network 68 is electrically connected in parallel with the secondary winding 67. This network is a self-biased, fast acting diode clipper and functions to flatten the top of the pulse appearing across the secondary winding 67. Pulse shaping network 68 is composed of diodes 69, 70 and 71 in series with a capacitor 72. Resistors 73, 74, 75 and 76 are serially arranged and connected in parallel with the diodes 69, 70, 71 and the capacitor 72, respectively. A clamping diode 77 and a current limiting resistor 78 are also serially connected in parallel with secondary winding 67 in such a manner as to clip the reverse recovery spike of transformer 52. The dotted terminal of secondary winding 67 is connected to a negative D.C. bias voltage and the undotted terminal is connected to the grid of the traveling wave tube TWT 80.

Traveling wave tube 80 is typically a three element high frequency amplifying device having an anode, cathode and grid control electrode with provisions for coupling the low level input R.F. signal to one port of the device and an output port for coupling the amplified R.F. signal to an antenna of a radar system, for example.

The basic operation of the pulse modulator circuit, with all switches in the 1.5 microsecond pulse position, will now be described in detail commencing with the application of a single trigger pulse being applied to the input of pulse driver circuit 20. The applied trigger pulse (shown as the first pulse in waveform A of FIG. 2) is coupled to both the pulse generator circuit 20 and the discharge circuit switch 50. Capacitor 35 couples the trigger input pulse to SCR 29 in the pulse generator circuit and causes it to become conductive. As a result of its conduction, current will flow through the primary winding 27 from the D.C. voltage supply via SCR 29 to ground and a pulse will be generated in both the secondary windings 23 and 24. Secondary winding 23 will couple this pulse to the primary winding 21 of the hold-off circuit 11. Since the polarity of the pulse is negative, however, diode 22 will be in its high impedance state and will prevent this pulse from being coupled to the gate electrode of SCR 12. The pulse appearing at secondary winding 23 however, will also be coupled to the delay line 26 and will propagate down the delay line and will be reflected back out of phase and delayed from the incident pulse, and hence the reflected pulse will be positive going and will pass through diode 22 and cause SCR 12 to become conductive a predetermined time after the initial trigger pulse as shown by the first positive going pulse in waveform B of FIG. 2. Current will then flow from the regulated D.C. voltage source through SCR 12 through the resonant charging reactor 14 and thence to the pulse forming network 48. Since the pulse forming network 48 is an inductive-capacitive type of device, the voltage will increase exponentially to a final value as shown by the first curve in waveform D of FIG. 2 which is approximately twice the value of the regulated D.C. voltage source, thereby reverse biasing SCR 12 and turning it off. This voltage doubling is a consequence of the series resonant circuit resulting from the proper selection of the resonant charging reactor 14 and the effective input capacity of the pulse forming network 48.

The same trigger input pulse that is coupled to pulse driver 20 is also coupled to the discharge circuit 50 via capacitor 43. The trigger pulse applied to the gate electrode of SCR 42 causes it to become conductive, however, since the holdoff circuit 11 is not actuated by the initial trigger pulse, but rather by the reflected delayed pulse, no voltage existed at junction 15 during the initial trigger period, hence SCR 42 never turns on. In like manner, the other output of the delay line 26 which is coupled to the tail clipping circuit 53 is rendered ineffective since there is no output pulse from the pulse forming network to be clipped.

Figure 2:
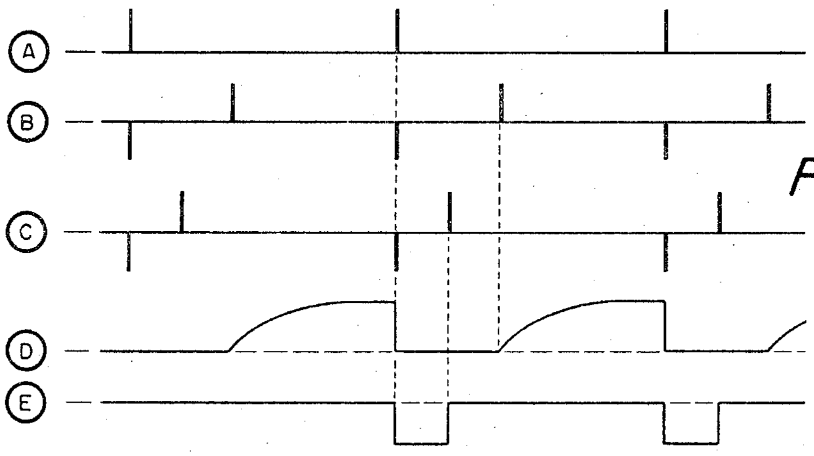
FIG. 2 represents a voltage vs. time diagram of typical wave forms associated with the specific embodiment described hereinafter.
Figure 3:
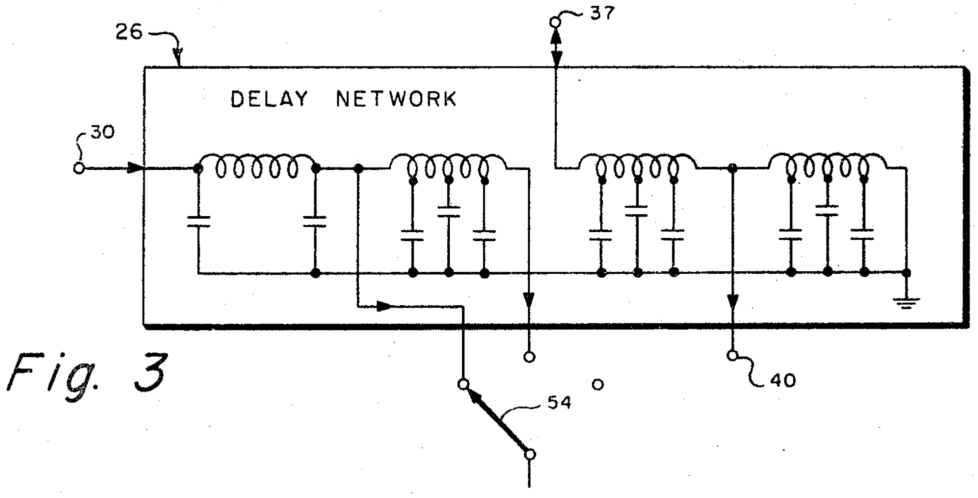
FIG. 3 represents a typical delay circuit in the specific embodiment described hereinafter.

Upon application of the second trigger pulse as shown by the second pulse in waveform A of FIG. 2, the voltage appearing at junction 15 (as a result of the conduction of SCR 12 on the previous trigger pulse) is discharged through SCR 42. SCR 42 will continue to conduct only so long as current can be applied from the pulse forming network, and since the network is composed of basically reactive elements, that is, capacitors and inductors, as soon as these reactive components are discharged, current will cease to flow through SCR 42, and as a consequence thereof, SCR 42 will turn off.

To prevent the possibility of too large a negative voltage backswing from the pulse forming network 48 and to enhance the turn-off of SCR 42, diode 46 and resistor 47 are serially connected to the junction 15. These elements act as a clipping circuit to the negative voltage backswing by preventing junction 15 from becoming more negative than the forward conduction voltage of diode 46 and the voltage developed across resistor 47.

The output 81 of the pulse forming network 48 is connected to a tap on the isolation transformer 52 and is similarly connected ot the tail clipping circuit 53 via the parallel connected diodes 63 and 64. The tail clipping circuit is actuated by a signal derived from either the secondary winding 24 from the pulse driver circuit 20 through delay circuit 26 or from secondary winding 23 through delay circuit 26, diode 60 and winding 79, depending upon the position of the switches. The output pulse from the delay circuit 26 is connected through switch 54 to the primary winding 55 of transformer 56. The pulse on the primary winding 55 is transformer coupled to secondary winding 57 and thence to the gate electrode of SCR 58. As a result of the application of this pulse, SCR 58 becomes conductive and discharges the trailing edge of the pulse resulting from the pulse forming network 48. In this manner the output pulse of the pulse forming network is sharply clipped by the tail clipping circuit and thereby produces the exact desired pulse width for all modes of operation of the pulse forming network.

The output of the pulse forming network is then coupled to a pulse shaping circuit 68 via isolation transformer 52. The primary tap of winding 66 is selected on the basis of the best pulse shape at point D so as to accommodate any T.W.T. load variations.

The pulse shaping circuit 68 is a self-biased, fast acting diode clipper connected across the secondary winding 67 and functions to flatten the pulse top to within a prescribed tolerance so as to prevent overshoot and also droop in the pulse. The flattening of the pulse top is accomplished in the following manner: during the pulsed interval, a positive going pulse appears across secondary winding 67, the undotted terminal being positive with respect to the dotted terminal of winding 67; since diodes 69, 70 and 71 will be biased in their forward conduction region, capacitor 72 will be charged positively to the magnitude of the pulsed voltage. In a similar manner, resistor 76 is selected so that the time constant created by resistor 76 and capacitor 72 is such that capacitor 72 will not appreciably discharge between trigger pulse intervals. Accordingly, upon the occurrence of subsequent trigger pulses, capacitor 72 will already be substantially charged and therefore diodes 69, 70 and 71 will not conduct unless the subsequent pulses are of greater amplitude than the voltage on capacitor 72. If diodes 69, 70 and 71 do conduct on the subsequent pulses, the top of the pulse will be clipped or flattened in such a manner as to eliminate overshoot or droop on the pulse as shown in waveform E of FIG. 2.

The output pulse of the pulse shaper 68 is then connected to the control grid of the traveling wave tube 80 to control the conduction in the tube. During the pulsed interval, the R.F. input signal applied to the traveling wave tube 80 is allowed to pass through the tube and be amplified and then coupled to a transmitting antenna, for example, of a radar system.

From the aforementioned description of a specific embodiment of the invention it will be appreciated that a significant improvement in pulse modulators has been achieved. The novel use of silicon controlled rectifiers has produced a pulse modulator which generates pulses of steep rise and fall time and of variable pulse width. Moreover, as a consequence of using silicon controlled rectifiers, the pulse to pulse jitter of prior art devices is considerably reduced. Furthermore, the present invention has produced a more reliable, lighter weight pulse modulator which lends itself to miniaturized and ruggedized construction.

Various modifications are contemplated and may obviously be resorted to by those skilled in the art without departing from the spirit and scope of the invention, as hereinafter defined by the appended claims, as only a single embodiment thereof has been disclosed.

What is claimed is:

1. A control circuit for a traveling wave tube comprising:

first means for inhibiting the passage of a D.C. signal supplied thereto;

second means connected to said first means for providing thereto a control signal thereby to permit the passage of said D.C. signal;

delay means connected with said second means to delay said control signal for a selected time interval;

pulse forming means connected with said delay means and said first means for storing said D.C. signal and adapted to provide a pulse upon the receipt thereto of a trigger pulse; and pulse clipping means connected with and responsive to said delay means and said pulse forming means and adapted to clip the trailing edge of the pulse so formed thereby to provide a sharp pulse.

2. A control circuit as set forth in claim 1 wherein said pulse forming means comprises:

resonant charging and discharging means for receiving and storing said D.C. signal for said selected time interval; and discharge circuit means connected with said resonant charging and discharging means for receiving discharged pulses therefrom whereby the leading edge of said pulse is caused to occur sharply.

3. A control circuit as set forth in claim 2 wherein said discharge circuit further comprises:

a silicon controlled rectifier having an anode, cathode and gate electrode, said anode electrode being connected to receive said discharging pulse, said cathode electrode being connected to ground and said gate electrode being connected to receive said trigger pulse.

4. A control circuit as set forth in claim 1 wherein said first means comprises:

a silicon controlled rectifier having an anode, cathode and gate electrode, said anode electrode connected to receive said control signal, said cathode electrode connected to said pulse forming means and said gate electrode connected to said second means to receive said control signal therefrom.

5. A control circuit for a traveling wave tube as set forth in claim 2 wherein said pulse forming means further includes:

first switching means operatively connected to a plurality of terminals of said resonant charging and discharging means, said switching means adapted to selectively vary the pulse width of the formed pulse.

6. A control circuit for a traveling wave tube as set forth in claim 5 further including:

isolation transformer means having a primary winding and a secondary winding, said primary winding connected with said first switching means and said pulse clipping means to receive said formed pulse; and pulse shaping means connected across said secondary winding and including a plurality of diodes serially connected with a capacitor to flatten the top of said formed pulse upon the reflection thereof into the secondary of said transformer.

7. A control circuit for a traveling wave tube as set forth in claim 2 wherein said resonant charging and discharging means further comprises:

reactor means connected between said first means and said discharge circuit means to provide resonant charging current.

8. A control circuit for a traveling wave tube as set forth in claim 5 wherein said pulse clipping means comprises:

a silicon controlled rectifier having an anode, cathode and gate electrode;

said anode electrode being connected to ground, said cathode electrode being operatively connected to said charging and discharging means and the gate electrode being operatively connected to said delay means.

9. A control circuit for a traveling wave tube as set forth in claim 8 wherein said delay means further comprises:

second switching means operatively connected with said first switching means and terminals of said delay means for selectively varying the period of the delay in accordance with said pulse width of said formed pulse.

10. A control circuit for a traveling wave tube as set forth in claim 9 wherein said pulse clipping means further comprises:

transformer means having a primary winding and more than one secondary winding, said primary winding connected between ground and said second switching means;

one of said secondary windings connected to the gate of said silicon controlled rectifier; and another of said secondary windings connected to the anode of said silicon controlled rectifier, whereby said silicon controlled rectifier is rendered conductive upon receiving a signal from said delay means thereby to provide said sharp pulse.

11. A control circuit for a traveling wave tube as set forth in claim 10 wherein said pulse clipping means further comprises:

first and second diodes connected in parallel circuit relation, the respective anodes of said diodes connected to the cathode of said silicon controlled rectifier and the respective cathodes of said diodes connected to said first switching means;

a third diode the cathode of which is connected to ground and the anode of which is connected to the cathode of said silicon controlled rectifier; and Zener diode means connected across the gate and cathode electrodes of said silicon controlled rectifier.

12. A control circuit for a traveling wave tube as set forth in claim 1 wherein said second means comprises:

transformer means having a primary winding and more than one secondary winding, one of said secondary windings providing a signal both to said first means and to said delay means, the other of said secondary windings providing a signal to said delay means; and switch means connected between said primary winding and ground and having a trigger electrode whereby one side of said primary winding is connected to render conductive said first means upon said trigger electrode receiving a pulse.

References Cited

UNITED STATES PATENTS

| | | | |
|---|---|---|---|
| 3,135,878 | 6/1964 | Eagle | 307—88.5 |
| 3,171,040 | 2/1965 | Goebel | 307—88.5 |
| 3,244,904 | 4/1966 | Schwartz | 307—88.5 |
| 3,296,551 | 1/1967 | Staples | 328—65 XR |

ARTHUR GAUSS, *Primary Examiner.*

S. D. MILLER, *Assistant Examiner.*

U.S. Cl. X.R.

307—237, 252, 264, 265, 293; 328—67